United States Patent [19]

Reccius

[11] Patent Number: 5,161,923
[45] Date of Patent: Nov. 10, 1992

[54] CLAMPING OF WORKPIECES

[75] Inventor: Helmut Reccius, Munich, Fed. Rep. of Germany

[73] Assignee: Gerhar Strauss Drucklufttechnik, Unterschleissheim, Fed. Rep. of Germany

[21] Appl. No.: 676,829

[22] Filed: Mar. 28, 1991

[51] Int. Cl.⁵ ............................................. B23B 45/14
[52] U.S. Cl. ................................... 408/72 R; 408/95; 408/103
[58] Field of Search .............. 408/72 R, 72 B, 115 R, 408/115 B, 79–82, 95, 97, 103

[56] References Cited

U.S. PATENT DOCUMENTS 2,839,953  6/1958  Hanger .............................. 408/72 R
2,935,905  5/1960  Winslow ...................... 408/72 R X
4,740,117  4/1988  Schaff Deleury et al. ....... 408/72 R

FOREIGN PATENT DOCUMENTS 2817218  10/1979  Fed. Rep. of Germany .
3222037   4/1984  Fed. Rep. of Germany .... 408/72 B Primary Examiner—Steven C. Bishop
Attorney, Agent, or Firm—R. H. Siegemund

[57] ABSTRACT

A machine tool is received in a structure that is carried along with the tool and has a sleeve extension which will be received in a tapered element with radially spreadibly tongues having end beads which will lodge behind a shoulder in teplate thereby positioning and clamping the tool; the receiver is additionally urged against the template and the tool by a piston cylinder drive.

9 Claims, 3 Drawing Sheets

CLAMPING OF WORKPIECES

BACKGROUND OF THE INVENTION

The present invention relates to a clamping and fastening device for holding and receiving workpieces for the performance of cutting operations such as drilling, milling or the like; the device includes a structure for receiving and holding the tool itself or a tool carrying, tool driving machine; further included is a guiding structure for the tool, the guiding structure is to be effective during the working process; the structure involved includes, finally, a stationary workpiece clamping and holding device.

It is general practice to use positive, i.e. force-interactive connections, for example between drilling templates and a drilling machine, which connection includes a so-called drill sleeve or bushing. The connection between such a drill sleeve of the foregoing kind, and the requisite drilling template is carried out through riveting, bolting, screwing or bonding. Locking is carried out here under utilization of a bayonet connection. The drilling machine is rotated in relating to the drill sleeve for purposes of locking and latching. The prior art, moreover includes the following references; German patent 32 22 037 A1, U.S. Pat. No. 4,740,117; German Patent 28 17 218 A1.

DESCRIPTION OF THE INVENTION

It is an object of the present invention to provide a new and improved positive locking between a workpiece and a tool, under utilization of structure that provides for a well defined tool advance motion;

It is another object of the invention to improve the requisite clamping and locking members in a machine tool device, and to improve also the clamping and locking process of such an arrangement as a whole. Of course, the inventive structure should lead also to an improved result as far as the working itself is concerned.

It is therefore an object of the present invention to provide a new and improved clamping device for receiving workpieces for cutting operations such as drilling, milling or the like and which includes structure for receiving a work tool or a machine carrying the work tool, and which further includes a structure for guiding the tool during working and for stationarily clamping the work itself.

In accordance with the preferred embodiment of the present invention, it is suggested to provide a locking element having connecting members which can spread radially outwardly in resilient fashion and will selectively and in a controlled fashion engage a work engaging template, and which further includes a clamping element which when inserted into the locking element acts on the locking element and can be adjusted in the advancing direction together with either the tool itself or the tool holding machine, for purposes of obtaining the clamping of the work though the spreading of the connecting members.

The inventive clamping device obviates the need for a relative turning between the working machine on the one hand and the work templates and other parts which are basically necessary as well as relative motion between the motion between that machine and the tool guiding element such as the drill sleeve. This means that particularly configured tool guiding elements such as drilling sleeves or bushings with bayonet locks are no longer necessary. Also, the templates can be made considerably cheaper. Owing to the fact that a relative motion is no longer needed for locking, the space requirement for working and receiving the working machine is reduced and, for example, the spacing between rivets, i.e. the spacing between borer-receiving rivets can be reduced accordingly.

The inventive configuration for clamping operates under exclusive use of a manually introduced axial force acting in the direction of tool advance, because it is the clamping element that is being advanced and a force locking is obtained between the template and the tool machine or advancing device, while on the other hand, the same axial force provides the axial pressure force that is need for clamping workpiece.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 2 is a plan view of the locking element with connecting members as used in the device shown in FIG. 1 and 1a;

FIGS. 4, 5 and 6 illustrate individual work phases of the clamping structure shown in FIGS. 1 and 1a.

Figure 1A:
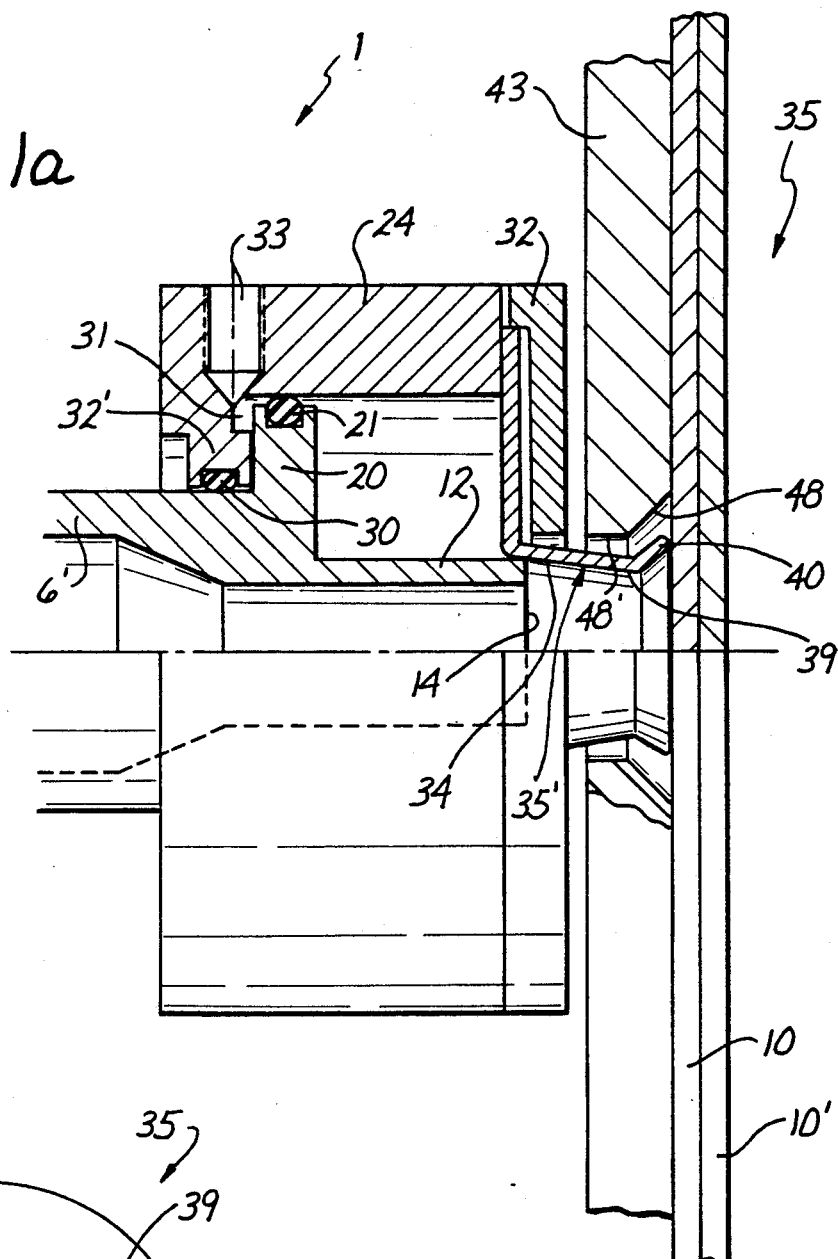
FIG. 1a is an enlarged detail of FIG. 1.

Proceeding now to the detailed description of the drawings, the clamping structure as a whole is indicated in the Fig. with reference numeral 1. A bore or drilling machine 3 is provided for carrying the tool—generally, which in this case is a drilling tool 4. The task at hand is to receive and center the drill machine 3 in relation to a workpiece or work pieces such as 10 and 10'. For this purpose the clamping structure includes a tool receiving part 6 with frontal extension 6'. The tool machine 3 is provided with a chuck 9 for receiving holding and clamping the tool 4 to whatever drive unit is included in machine 3.

Receiving part 6 is provided with a bore 16 having the shoulder 15, and the work machine 3 can be shifted into the bore 16 and here in the direction R. The direction R is the general direction of tool advance. The receiving extension 6', on the other hand, is secured to the main receiving part 6 by means of threading 13. A central bore of and in receiving part extension 6' permits adjustment of the drill tool 4 in the direction R towards and with respect to workpieces 10 and 10' being in this case sheet metal pieces into which bores have to be drilled.

An adjusting piston 20 is formed at the receiving part extension 6' having the configuraion of an annulus. This piston 20 is adjustably movable in a pressure cylinder chamber 31 established by a cylinder part and piston chamber 24. The direction of piston movement is, of course, also the direction R of the tool 4, or the reverse. The pressurizable cylinder and piston chamber 31 has its ends closed through walls 32 and 32' respectively and in relation to the cylinder part 24. The adjusting piston 20 is provided with a piston ring as is customary per se and the front wall 32 is provided with a sealing ring 30 for sealing vis a vis the piston 20.

The cylinder part 24 has radial bores 33 which terminate in the pressure cylinder chamber 31, just ahead of the piston 20. The combined receiver part 6—6' faces the sheet metal part 10 and 10' and on that side of the extension 6' facing the work, a clamping sleeve 12 is provided having an annular front face 14 which serves as a clamping surface for operating the latch as will be explained more fully below. In the case of the configuration shown specifically in FIG. 1, a locking element 35 is concentrically configured in relating to the clamping sleeve 12. This locking element 35 has a conically configured sleeve like portion 35' and a correspondingly conically tapering bore 34.

Figure 2:
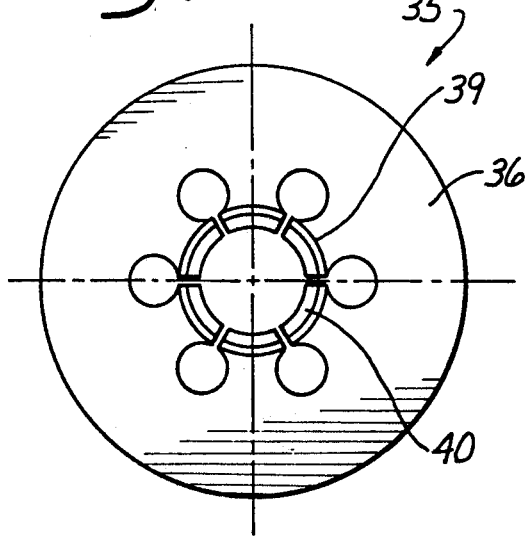
Figure 3:
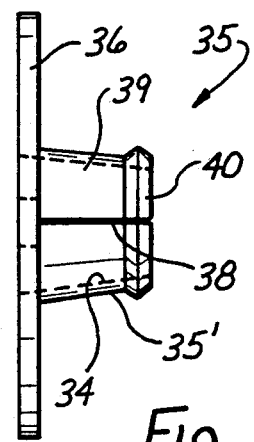
FIG. 3 is a side view of the locking element shown in FIG. 2.

The locking element 35 as is shown in detail in FIGS. 2 and 3 has an annular flange or disk portion 36 which establishes the locking function together with the sleeve like portion 35'. The sleeve like portion 35' of locking element 35 is provided with longitudinal slots 38 extending in radial direction and establishing resiliently acting spreading tongues 39; these tongues are the connecting members of this device. Accordingly, upon sliding and shifting the receiver 6,6' with clamping sleeve 12 so that sleeve 12 enters the bore 34 of the sleeve portion 35', the tongues 39 are resiliently forced in radial outward direction. The clamping sleeve 12 will abut in contact with the workpieces 10 or 10' under utilization of the particular clamping surface 14. This will be explained more fully below.

Figure 1:
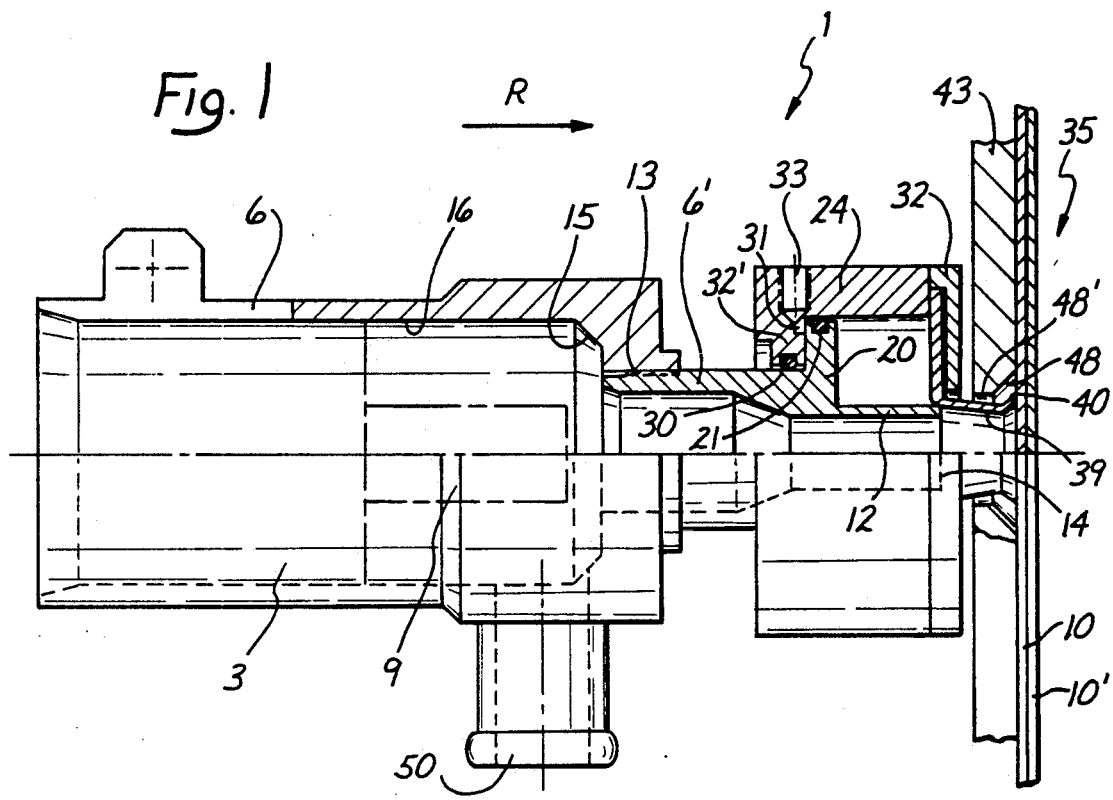
FIG. 1 is a clamping device in accordance with the preferred embodiment of the present invention showing in a somewhat schematic fashion the best mode of practicing the invention.

As shown further in FIG. 1, there is a drilling template 43 mounted on the work piece 10, and the task at hand is to drill bores into the piece 10 in locations that are determined by the template 43. The template generally can be deemed the guide structure as far as its bores such as 48' are concerned. Hence the locations of drilling are specifically defined by bores such as 48' in the template 43 and each such bore has a chamfered or bevelled portion 48. The clamping tongues 39 have at their free ends contour locking elements in the form of cams or beads 40. These cams, beads or lugs 40 will engage the respective locking shoulder 48. The bevelled locking shoulder 48, moreover, is established on the side of the template 43 facing the part to be worked on namely 10. The template 43, moreover, will be held by means of a stationary support at the workpiece 10 or 10' under orientation of bushings carried by the template 43.

Figure 4:
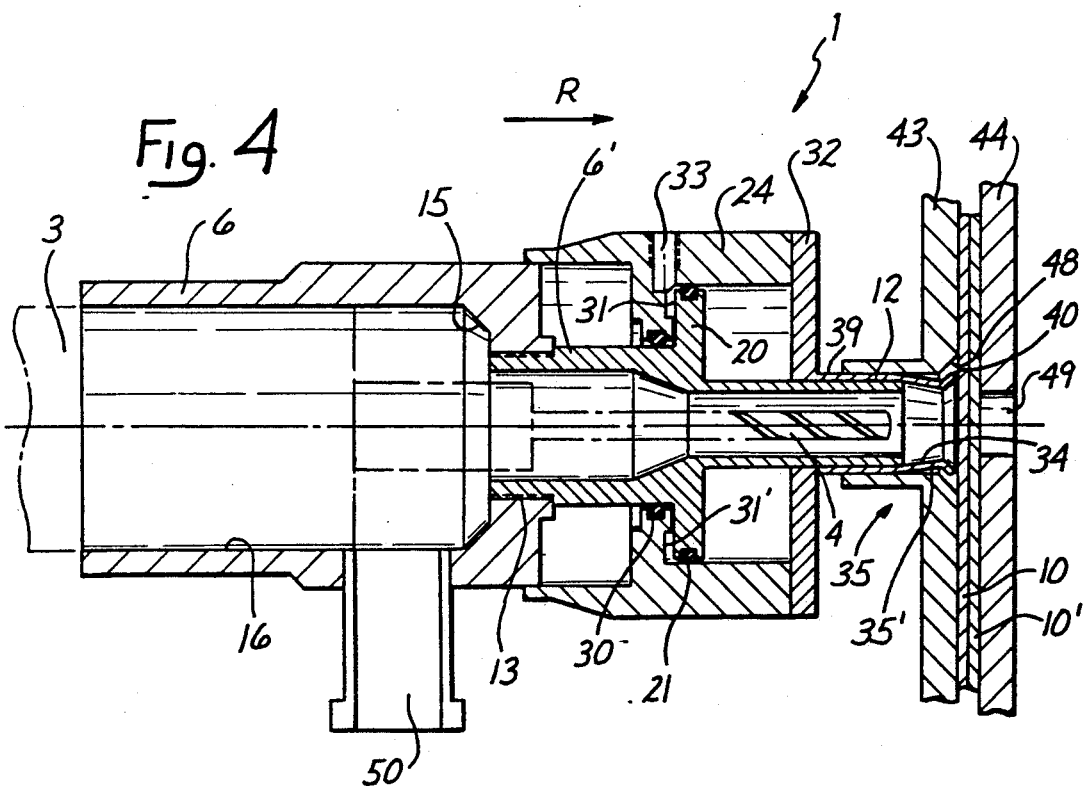
Figure 5:
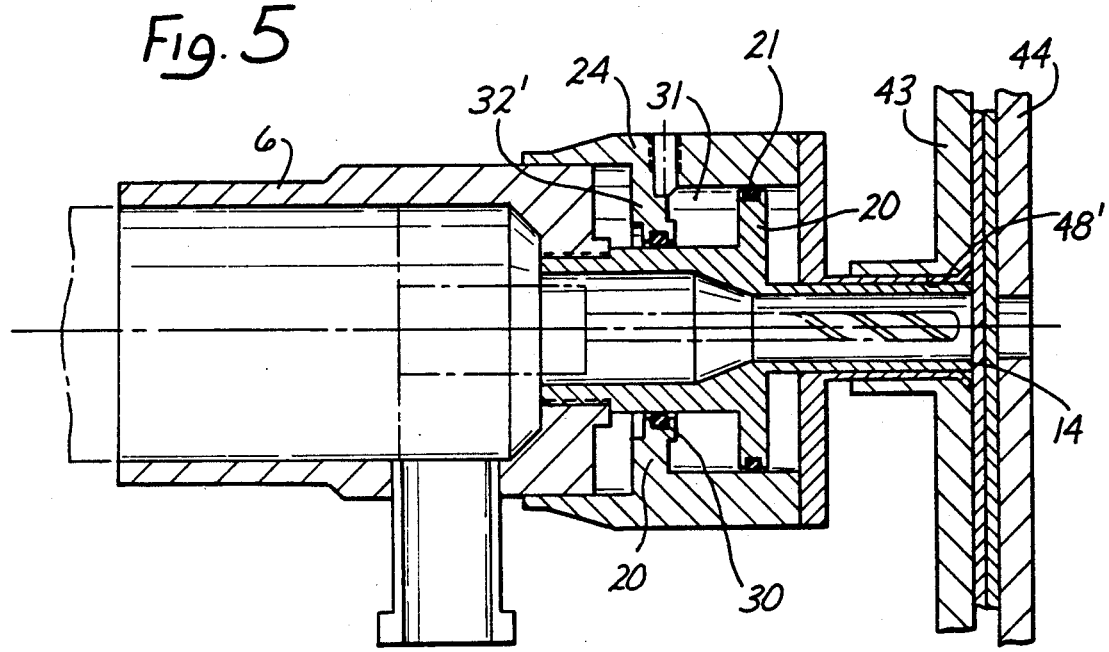
Figure 6:
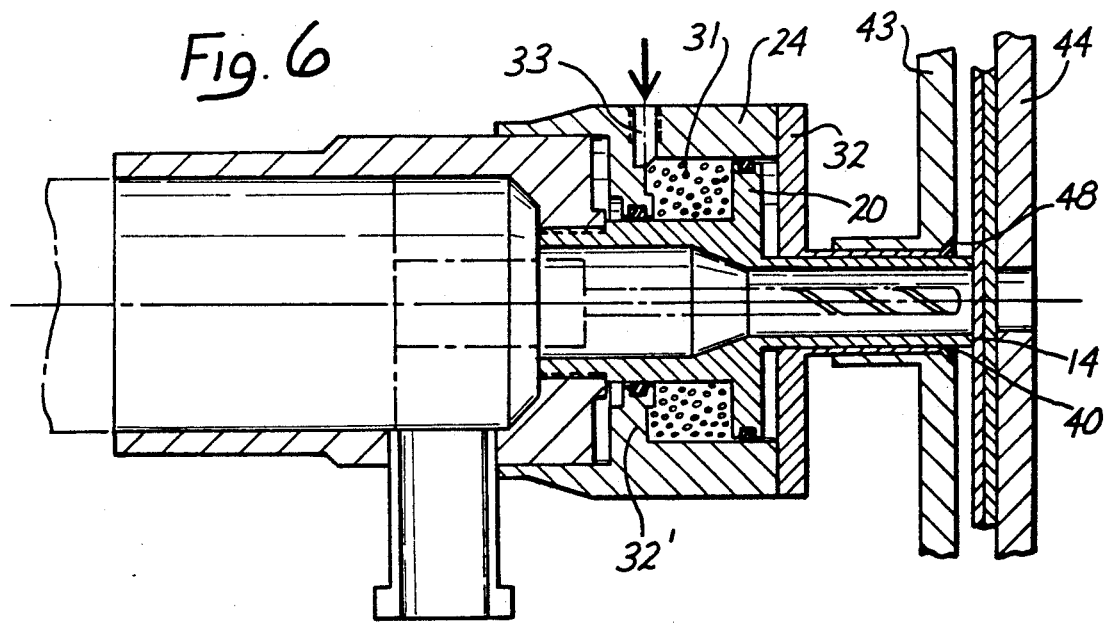

In the particular example shown in FIGS. 4, 5, and 6 which is basically similar to the construction of FIG. 1 but is provided with a second template 44 at the rear of work 10', the following functions are being performed. The workpieces 10 and 10' are oriented and held between the two templates 43 and 44 and are oriented in relation to a stationary worktable. The template 44, moreover, is provided with a bore 49 through which the drill bit 4 can be extended to obtain drilling proper all the way through the work pieces 10 and 10'. The cuttings of the drilling will be sucked out of the system. For this, a suction nipple and opening 50 is provided, leading into the bore 16 of the receiver part 6 and being connected to a suction device which is not shown.

The structure as described is operated as follows. The initial phase is shown in FIG. 4 and here the clamping device 1 is begun to be operated in that the drill machine 3 is shifted into the bore 16 of the receiving part 6 with its extension 6' while the drive in the machine 3 generally is not yet operating. The drill machine 3, moreover, will bear against the shoulder 15 in receiving parts 6 during further insertion. Hence, as the advance of the drill 3 in the direction R continues, the receiving parts 6 and 6' will be carried along towards the workpieces 10 and 10'. Owing to this particular coupling of the drill machine 3 with the receiving parts 6 and 6' and the clamping sleeve 12 will advance relative to the stationary structure 24 and 35. The front edge or front face 14 of the sleeve (which is the principal clamping actuator and element) will be inserted into the tapered bore 34 of the locking element 35.

Consequently, there is a relative motion between the receiving parts 6 and 6' and the clamping sleeve 12 on the one hand, and the concentrically arranged locking element 35 on the other hand. Owing to this relative motion, the resiliently configured tongues 39 of locking element 35 are forced in radially outward direction. Consequently, the locking element 35 by means of its tongues 39 which are now being spread, will reach through the bore 48' of the template 43.

The next phase is generally depicted in FIG. 5 and here there is still a certain preparation going on as far as clamping and working is concerned. Specifically, the tongues 39 will be forced radially outwardly in a continuing fashion owing to the continued relative motion between the sleeve 12 and the locking element 35, the advance of the tool 4 is of course in the direction R. This relative axial motion continues until the tongues 39 and particularly the form locking bead members 40 reach through the frontal template 43 and the bore 48' thereof, and when, specifically, these locking members 40 lock against the locking chamfer 48. This connection establishes a positive connection between the template 43, on the one hand, and the locking element 35, on the other hand, under utilization of the tapering 34.

As shown specifically in FIG. 5, the clamping sleeve 12 with its front face 14 urges, or better, is urged against the workpieces 10 and 10' and this way these latter parts are forced against the rear template 44 of the tool clamp and holding structure; this way then a positive connection is established between the template 43 and the locking member 35 with its cylindrical part 24.

FIG. 6 now illustrates the final working phase of the clamping device 1. The drill machine 3 is turned on and also pressurized air from a suitable pressurized air source will be fed through the bore 33 into the pressure cylinder chambers 31 and 31'. Owing to an increase in pressure in these chambers 31 and 31', the receiver extension with its piston 20, is forced against the parts to be drilled, namely sheet metal parts 10 and 10' while bearing specifically against the firmly held cylinder part 24.

Following drilling, the drill machine 3 is turned off and the pressure cylinder chamber 31 and 31' will be vented. The machine 3 is retracted and this automatically relieves the locking element 35 by means of resiliently returning tongues 39 so that disconnection between the locking member 40 and the template 43 is automatically provided.

The invention is not limited to the embodiments described above but all changes and modifications thereof, not constituting departures from the spirit and scope of the invention, are intended to be included.

I claim:

1. A clamping device for receiving workpieces and for holding workpieces in relation to cutting tools such as drills, milling tools or the like, and comprising means for receiving a work tool or a work tool holding machine, a guide structure for the tool during operation including a template, and a stationary workpiece clamping and holding structure, the improvement comprising a locking element with resiliently radially outwardly spreadable locking members for locking against the template;

sleeve structure disposed in relation to the locking element so that upon insertion of the sleeve into the locking element the members spread to obtain the locking of the connecting members against an edge of a bore in the template; and driving means coupled to the sleeve for driving the sleeve through the clamping member and against the workpieces thereby holding the work pieces together while permitting the tool to pass through the sleeve in a centered position by operation of the bore in the templet, permitting the templet to lift off.

2. A clamping sleeve element as in claim 1, the sleeve extending from a means for receiving the drill tool.

3. Device as in claim 1, the driving means being a piston/cylinder drive.

4. Device as in claim 3, the cylinder of the drive being positively connected to the locking element (35).

5. Device as in claim 1, the locking element being a tapered sleeve with slots to obtain the resilient members.

6. Device as in claim 3, the sleeve being secured to the piston of the drive means the cylinder being connected to the locking element.

7. A clamping device for receiving workpieces and for holding workpieces in relation to cutting tools such as drills, milling tools or the like; comprising:

means for receiving a work tool or a work tool holding machine and having a forwardly extending sleeve;

a guide structure for guiding the tool during operation including a template having a centering bore;

a locking element with resiliently radially outwardly spreadable locking members for traversing the bore in the templet and locking against bore edges of the template;

the sleeve being disposed in relation to the locking element so that upon insertion of the sleeve into the locking element the members spread to obtain the locking of the connecting members against the edge of the bore in the template; and driving means coupled to the sleeve for driving the sleeve in relation to and into the clamping member to engage and act against the workpieces thereby holding the work pieces together while permitting the tool to pass through the sleeve in a centered position by operation of the bore in the templet, permitting the templet to lift off the workpieces.

8. Device as in claim 7 the driving means being a piston/cylinder drive.

9. Device as in claim 8, the sleeve being secured to the piston of the drive means the cylinder being connected to the locking element.

* * * * *